May 29, 1928. 1,671,201
F. MICHOCK
HANDSAW
Filed May 15, 1924 2 Sheets-Sheet 1

INVENTOR.
Frank Michock
BY Stuart C. Barnes
ATTORNEY.

May 29, 1928.   1,671,201
F. MICHOCK
HANDSAW
Filed May 15, 1924   2 Sheets-Sheet 2
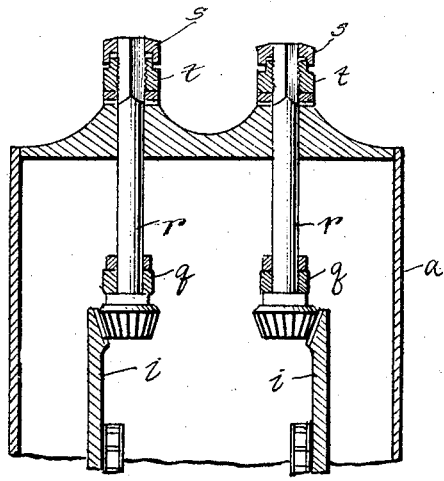
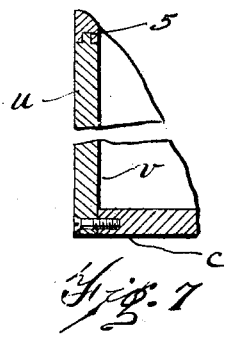
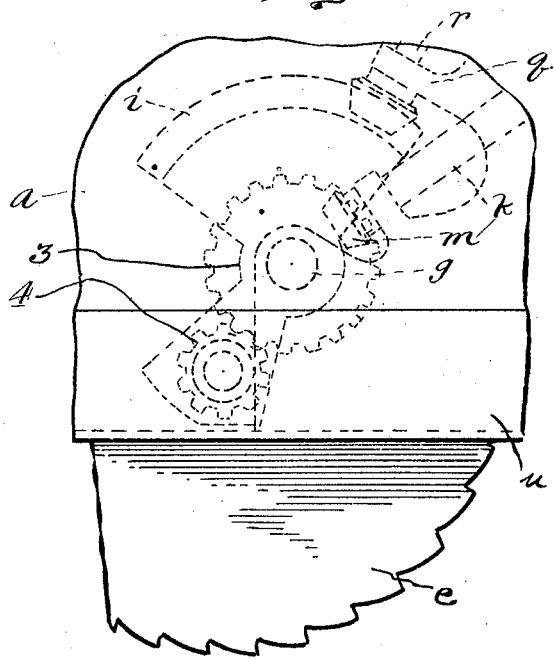
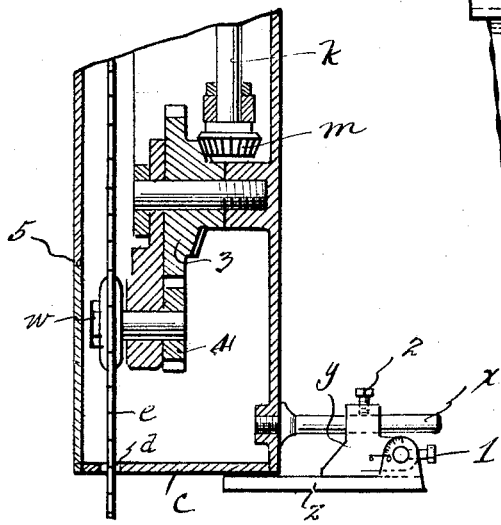
INVENTOR.
Frank Michock
BY
Stuart C Barnes
ATTORNEY.

Patented May 29, 1928.

1,671,201

UNITED STATES PATENT OFFICE.

FRANK MICHOCK, OF DETROIT, MICHIGAN.

HANDSAW.

Application filed May 15, 1924. Serial No. 713,401.

This invention relates to a power driven hand saw, the object of which is to provide a saw which may perform longitudinal or cross cutting operations on a piece of wood stock more readily and efficiently than is the case with the ordinary hand saw.

Another object is to provide means for entirely enclosing the working parts of the saw to eliminate any danger of the operator entangling his clothes or hands in the rapidly revolving saw mechanism. Another object is to provide means for projecting the saw from the housing, said means adapted to lock the saw in any position desired. A further object is to provide a driving connection so that the saw is operated in all positions.

Another object is to provide a gauge so that the saw may be adjusted to cut any desired width. Also it is often desirable to cut a piece of wood stock at an angle to the plane of wood. Means are provided for so adjusting the saw that any desired angle may be cut. Furthermore, when the saw becomes worn the same may be readily removed from the machine and a new one inserted in its place.

In the drawings:

Fig. 4 is a section taken on the line 4—4 of Fig. 1.

Fig. 5 is a view similar to Fig. 2 but showing only one saw contained within the housing, and a modified form of driving connection.

Fig. 6 is a detail of the modified form of driving connection, showing driving gears in place of a chain and sprocket wheels.

Fig. 7 is a detail section taken on the line 7—7 of Fig. 1.

A housing $a$ has secured thereon a handle $b$ so that the same may be moved at the will of the operator. A bottom $c$ is secured to the housing and is provided with elongated slots $d$ through which the saws $e$ are adapted to be projected.

Figure 3:
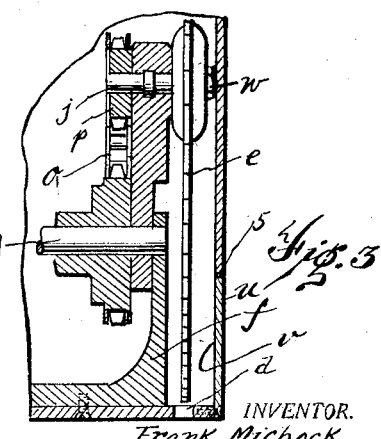
Fig. 3 is a section taken on the line 3—3 of Fig. 1 showing the saw in a raised position.

A bracket $f$ is secured to the housing. This bracket forming bearings for the shaft $g$ which pivotally supports the segmental saw carrier $h$ provided with the segmental rack teeth $i$. This carrier also rotatably supports a short shaft $j$ to which is keyed or otherwise secured a saw $e$. As shown in Fig. 3 the bracket $f$ is substantially U-shaped and between the two upright portions of the bracket is rotatably supported a driver comprising a sprocket and gear. However, the sprocket and gear could be separate and each keyed to the shaft. A driving shaft $k$ has secured on the end thereof a beveled gear $m$ which meshes with the gear teeth $n$ carried by the second driver. A chain $o$ connects the sprocket portion of the driver to the sprocket $p$ carried on the shaft $j$. As the shaft $j$ is rotated the beveled gear $m$ will rotate the driver, thereby rotating the saw $e$ through the chain drive $o$.

Figure 1:
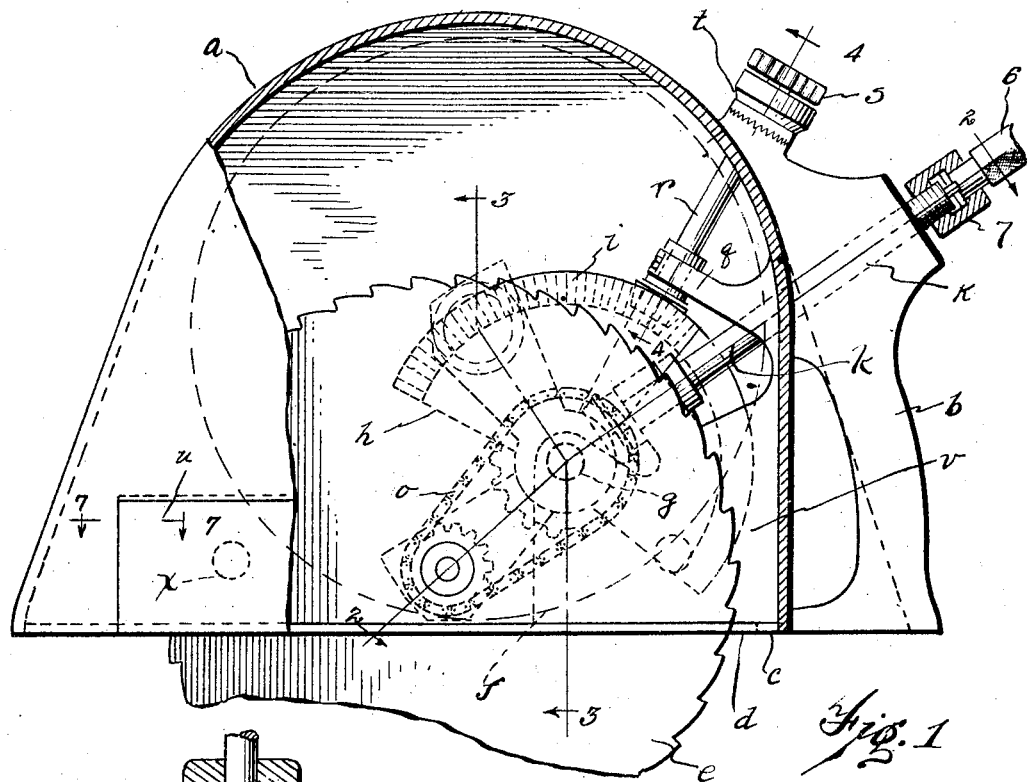
Fig. 1 is a side elevation of the hand saw partly in section.
Figure 2:
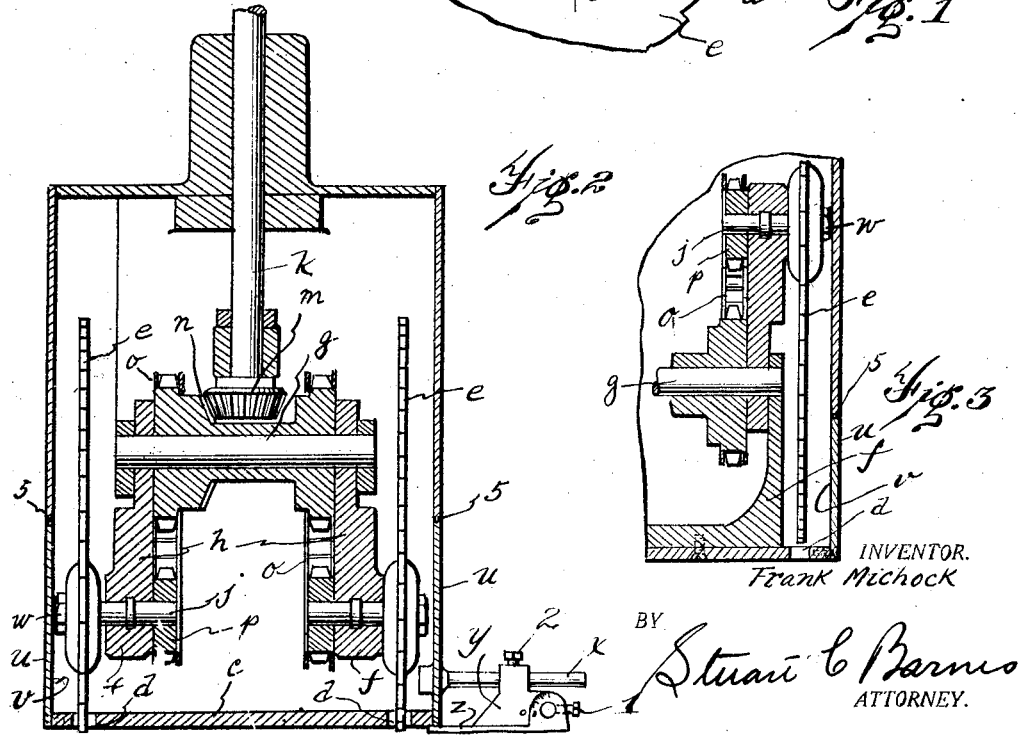
Fig. 2 is a section taken on the line 2—2 of Fig. 1.

This bracket $h$ is further provided with a projection $q$ which supports the shaft $r$, the said shaft having a beveled gear on the end thereof which meshes with the rack teeth $i$ carried by the saw carrier $h$. The opposite end of the shaft $r$ is projected through the housing and is supported therefrom by suitable bearings, and a thumb turn $s$ secured on the end thereof. A lock nut $t$ is adapted to be screwed down on the shaft $r$ to lock the said shaft from rotation. As the thumb turn $s$ is actuated the carrier will be rocked and carry with it the stud shaft $j$ which supports the saw. In Fig. 1, the saw is shown in the operating position, that is,—with the saw projecting from the housing. By turning the thumb turn the carrier will be caused to rock in a clockwise direction and retract the saw within the housing.

A plate $u$ covers an opening $v$ in the side of the housing, the said plate being bolted to the housing at each end, as shown in Fig. 7. The top of the plate supported by the tongue-and-groove connection 5, with the housing. When a saw wears out or is partially broken, the same can be removed by lowering the saw as far as it will go, removing the plate $u$ loosening the nut $w$ which secured the saw to the stud $j$ and then removing the saw.

On one side of the housing is secured a pair of studs $x$ on which is adjustably secured a gauge support $v$, which adjustably and pivotally supports the gauge plate $z$. The gauge plate $z$ may be secured in any of the adjusted positions by tightening the set screw 1. It will be noticed in Fig. 5 that the guard plate $z$ may be rotated so as to incline the saw housing and saw at any desired angle to the horizontal. This will mean that the saw will cut an inclined cut on the wood stock. When the guard plate and guard support are adjusted in the position shown in Fig. 5 the saw is cutting a perpendicular cut in the wood stock; by loosening the set screw the entire gauge may be slid along the stud $x$ thereby adjusting the width of the cut by increasing or decreasing the distance of the cut from the edge of the wood stock.

Fig. 6 shows a modified form of construction in which the chain drive is replaced by a pair of gears 3 and 4. This construction will work as efficiently as the chain drive but is more costly and the chain drive is the preferred form. The end of the drive shaft $k$ is threaded to receive the ordinary coupling 7 for attaching the end of the flexible drive shaft 6 thereto. Obviously, the shaft could be coupled up to other suitable driving mechanism.

What I claim is:

1. A saw, having in combination, a housing, a saw carrier pivotally supported within the housing and provided with a segmental rack, a saw rotatably supported by the carrier, means for rotating the saw, and hand operated means including a pinion which engages the segmental rack to rock the carrier for the purpose of projecting the saw from said housing.

2. A saw, having in combination, a housing, a saw carrier pivotally supported within the housing and provided with a segmental rack, a saw supported by said carrier, means for rotating the saw, means including a manually actuated pinion which engages said rack for rocking the carrier to project the saw from the housing, and a lock nut for locking the carrier rocking means in any one of the said adjusted positions.

3. A hand saw, having in combination a housing, a pair of saw carriers movably supported within the housing, saws each rotatably supported by one of the said carriers, means for rotating the saws, and separate means for rocking either of said carriers for independently projecting either of said circular saws from the housing into an operative position.

In testimony whereof I have affixed my signature.

FRANK MICHOCK.